United States Patent [19]

Frazier et al.

[11] Patent Number: 5,147,817
[45] Date of Patent: Sep. 15, 1992

[54] METHOD FOR FORMING PROGRAMMABLE RESISTIVE ELEMENT

[75] Inventors: Gary A. Frazier; Robert T. Bate, both of Garland, Tex.

[73] Assignee: Texas Instruments Incorporated, Dallas, Tex.

[21] Appl. No.: 614,889

[22] Filed: Nov. 16, 1990

[51] Int. Cl.$^5$ .................. H01L 21/72; H01L 21/203
[52] U.S. Cl. ........................................ 437/52; 437/107
[58] Field of Search ...................... 437/52, 105, 107; 357/23.5, 22 A, 22 MD

[56] References Cited

U.S. PATENT DOCUMENTS

| | | | |
|---|---|---|---|
| 4,558,337 | 12/1985 | Sannier et al. | 357/22 A |
| 4,905,063 | 2/1990 | Beltram et al. | 357/23.5 |
| 4,945,393 | 7/1990 | Beltram et al. | 357/23.5 |
| 5,023,674 | 6/1991 | Hikosaka | 357/22 A |
| 5,038,187 | 8/1991 | Zhon | 357/22 A |
| 5,055,890 | 10/1991 | Dawson et al. | 357/16 |

FOREIGN PATENT DOCUMENTS

| | | | |
|---|---|---|---|
| 0202755 | 11/1986 | European Pat. Off. | 357/22 A |
| 0305253 | 3/1989 | European Pat. Off. | 357/22 A |
| 0069476 | 3/1986 | Japan | 357/22 MD |

OTHER PUBLICATIONS

Kostalsky et al., "Novel High-Speed Transistor Based on Charge Emission from a Quantum Well", Appl. Phys. Lett., 52(11), Mar. 14, 1988, pp. 904–906.
Brodsky et al., "GaAs Electrically Alterable Read-Only Memory", IBM Tech. Disc. Bull., vol. 25, No. 3A, Aug. 1982, p. 1250.

Primary Examiner—Olik Chaudhuri
Assistant Examiner—Ourmard S. Ojan
Attorney, Agent, or Firm—Richard A. Stoltz; Richard L. Donaldson; Jay Cantor

[57] ABSTRACT

A programmable resistive element is provided which includes a channel 16 comprising a layer of gallium arsenide. A programming barrier 18 is disposed outwardly from channel 16. A storage gate 20 comprising a layer of intrinsic gallium arsenide is disposed outwardly from programming barrier 18. An insulator 22, comprising a layer of aluminum-gallium-arsenide, is disposed outwardly from storage gate 20. A control gate 24 is disposed outwardly from insulator 22. First and second spaced apart contacts 26 and 28 contact channel 16.

2 Claims, 2 Drawing Sheets

METHOD FOR FORMING PROGRAMMABLE RESISTIVE ELEMENT

TECHNICAL FIELD OF THE INVENTION

The present invention relates in general to resistive elements and in particular to a programmable resistive element.

BACKGROUND OF THE INVENTION

Programmable resistors can be utilized in a number of analog signal processing applications such as resistive ladders in analog to digital converters and in resistor arrays in neural networks. Neural networks provide a means for solving random problems, such as in real-world sensing systems which must "learn" from the surrounding environment so that solutions can improve with experience. Neural networks solve these sensing problems by expressing the sensor outputs as multi-dimensional vectors and then "learn" the vectors by constructing a matrix by correlation methods.

Neural networks use arrays formed by rows and columns of weighing elements, represented by resistors, to create the matrix vectors of voltages input from corresponding sensors using Ohm's law. Operational amplifiers sum the currents resulting from the drop of an input voltage across the resistors in each of the rows. The current output from each row represents the vector product for one component of a corresponding output vector. By storing the data in terms of resistor conductance values, an environment can be "learned" and later retrieved by associative recall. Thus, the resistors must first change with the system experience to "learn" an environment, but then remain fixed to recall the stored environment. Further, the neural network system can optimize the learned patterns of various environments by varying the resistive elements in the network.

Various means have been devised for providing variable weighing elements in neural networks. Each of these means has been found to have significant disadvantages. For example, circuitry using up-down counters and decoded switches along with fixed resistors may be used to generate the appropriate resistive weights, however, such an approach would be limited to only a small number of weighing elements, thereby limiting the complexity and utility of corresponding application. Electrically-erasable, electrically-programmable read-only memories (EEPROM) employing metal oxide semiconductor field effect transistors (MOSFETs) based on well known silicon structures provide another option. Silicon based devices, however, have significant limitations as to switching speed erasability lifetime, radiation tolerance and high temperature operation. Finally, dynamic random-access memories (DRAMs) have been considered, but DRAMs need refreshing after a read operation which greatly increases the number of overhead operations required in the overall scheme of the application.

Thus, the need has arisen for an improved programmable resistor having the capability to operate in demanding applications, such as neural networks.

SUMMARY OF THE INVENTION

According to the invention, a programmable resistive element is provided which includes a storage gate comprising of a layer of intrinsic gallium arsenide. The storage gate is separated from a channel comprising a layer of gallium arsenide by a programming barrier. An insulator layer is outwardly disposed from the storage gate. A control gate is disposed outwardly from the insulator. First and second spaced apart contacts, contact the channel.

According to other aspects of the invention, a voltage is applied to the control gate to induce an enhancement region in the channel. Application of a voltage between the first and second spaced apart contacts established a current flow through the enhancement region in the channel. A number of electrons are injected onto the storage gate thereby programming the programmable resistive element.

According to further aspects of the invention, the programming barrier is trapezoidal such that electrons can be injected onto the trapezoidal barrier when a suitable voltage is applied to the gate. While electrons are prevented from escaping from the storage gate when no voltage is applied to a control gate.

The present invention provides a programmable resistive element which may be used as either a nonvolatile memory or as the resistive elements in systems such neural networks and the resistive ladders used in analog to digital converters. The present invention has the advantages of high speed, the ability to operate over a large temperature range and good immunity to radiation. Further, the use of a trapezoidal barrier allows the retention of carriers while at the same time not providing substantial difficulty in programming the device.

BRIEF DESCRIPTION OF THE DRAWINGS

Other aspects of the invention and their advantages will be discerned when one refers to the following detailed description as taken in conjunction with the drawings, in which like numbers identify like parts and in which:

FIG. 1 is a schematic elevational sectional view of a programmable resistive device according to the invention;

FIG. 2 is a band profile drawing of the programmable resistive element of FIG. 1;

FIG. 3 is a band profile drawing of a first alternate embodiment of the programmable resistive element of FIG. 1;

FIG. 4 is a band profile drawing of a second alternate embodiment of the programmable resistive element of FIG. 1;

DETAILED DESCRIPTION OF THE INVENTION

Figure 5:
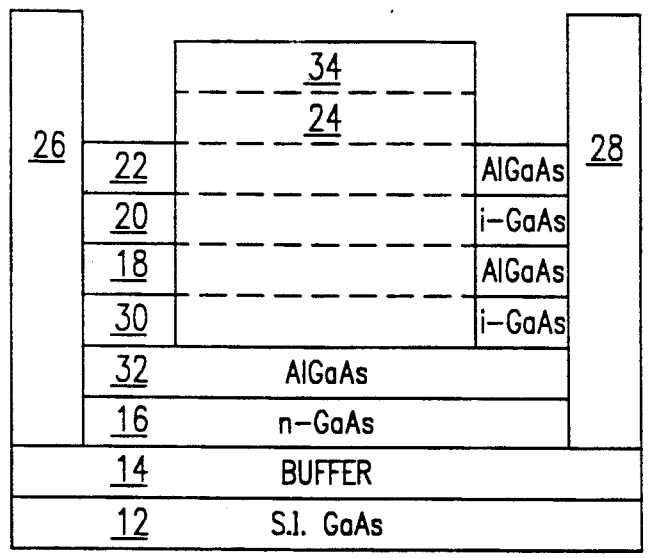
FIG. 5 is a schematic elevational sectional view of a preferred embodiment of a programmable resistive element having improved programming capabilities according to the invention.

Referring first to FIG. 1, a programmable gallium arsenide metal semiconductor field effect transistor (MESFET) is shown generally at 10. The transistor has a vertical structure and is formed on a semi-insulating gallium arsenide substrate 12. The vertical structure can be formed, for example, by successive layer growth by well-known techniques such as molecular beam epitaxy. A buffer 14 is grown across the face of substrate 12 and may be, for example, formed by a superlattice or a layer of wide bandgap material such as AlGaAs. A layer 16 of n-GaAs is next formed across buffer 14. Layer 16 is grown to a thickness of 3500 to 5500 angstroms and has a dopant concentration in the range of $1 \times 10^{17}$ cm$^{-3}$. Layer 14 functions as the channel of field effect transistor 10.

Next, a layer 18 of AlGaAs is formed across layer 16. Layer 18 has a thickness of 700 to 1300 angstroms and functions as the programming barrier in transistor 10. A layer 20 of intrinsic gallium arsenide (i-GaAs) is next formed across the surface of AlGaAs layer 18 to be of a thickness of 700 to 1300 angstroms. Intrinsic gallium arsenide layer 20 functions as the storage gate of transistor 10. A second insulating layer 22 of AlGaAs is then formed to a thickness of 700 to 1300 angstroms across the upper surface of floating gate 20.

Gate 24 is formed of a layer of metal across AlGaAs layer 22 and controls both the conductivity of channel 16 and the injection of carriers onto floating gate 20. Preferably, gate 24 functions as a Schottky barrier. A metal drain contact 26 and a metal source contact 28 are formed to provide ohmic contacts with channel area 16. Drain contact 26 and contact 28 operate to induce current flow in channel 16 as with a conventional MESFET. In the preferred embodiment, the sides of intrinsic gallium arsenide 20 are separated from source contact 28 and drain contact 26 by insulating regions (not shown), such as regions of aluminum nitride to prevent carrier transport.

The operation of transistor 10 can now be described referring to FIG. 1, and to FIG. 2, which depicts the band profile for transistor 10. In operation, a gate voltage $V_g$ of 5 volts is applied to gate 24. The application of gate voltage $V_g$ creates an enhancement region in channel 16. Current flow is established through the enhancement region in channel 16 by applying a voltage $V_{ds}$ between drain 26 and source 28. Preferably, source 28 is held at zero volts or ground while a voltage of 5 is applied to drain region 26. A number of the electrons moving between the source and the drain will have sufficient energy to inject hot electrons across AlGaAs barrier layer 18. These "hot" electrons come to reside on i-GaAs storage gate 20.

The accumulation of electrons on storage gate 20 reduces the electric field created in the channel 16 when a reading voltage of 2 volts is applied to gate 24. The reduced electric field in channel 16 narrows the enhancement region thereby increasing the impedance between drain 26 and source 28 due to velocity saturation in the pinch-off region near drain 26.

By storing electrons in storage gate 20, and consequently changing the impedance of channel 16, the present invention can be employed in at least two different ways. First, programmable MESFET 10 can be employed as a nonvolatile memory similar to conventional EEPROM cells. Second, by controlling the amount of electrons injected onto storage gate 20, the resistance of channel 16 can be effectively controlled, allowing programmable MESFET 10 to be used as a programmable resistive element.

Referring next to FIG. 3, a band profile for an alternative structure of transistor 10 is depicted. In this embodiment, barrier layer 18 is formed by a graded or modulated composition of AlGaAs. As barrier layer 18 is formed adjacent channel 16, the percentage of aluminum atoms replacing gallium atoms in the lattice is gradually increased. For example, barrier 18 may comprise Al$_{0.20}$Ga$_{0.80}$As adjacent channel 16 and Al$_{0.40}$Ga$_{0.60}$As adjacent floating gate 20. Such a compositionally graded structure may be formed, for example, by molecular beam epitaxy. While the preferred embodiment utilized aluminum-gallium-arsenide to form insulating layers, other materials are available for the same use. Examples include aluminum-gallium-arsenide, indium-arsenide gallium-nitride, an aluminum-arsenide.

Grading the composition of barrier layer 18 results in a trapezoidal barrier which separates channel 16 from floating gate 20. The shape of the barrier is such that injecting electrons onto storage gate 20 requires mounting a relatively low barrier, since as the programming voltage is applied to gate 24, the trapezoid "flattens out", and electrons are transferred into storage gate 20. When the voltage is subsequently removed from gate 24, it is more difficult for electrons to escape from storage gate 20, since the barrier height in the reverse direction is much higher than that of the forward direction. This allows electrons to be retained in storage gate 20. To remove electrons from storage gate 20, a large reverse bias is created between gate 24 and drain 26, such that electrons can be drawn in a reverse direction over the trapezoidal barrier created by barrier layer 18.

Formation of a barrier layer 18 which presents a trapezoidal barrier between channel 16 and floating gate 20 is not limited to composition modulation as depicted in FIG. 3. An alternate approach, using a chirped superlattice is depicted in the band profile of FIG. 4. In this embodiment, barrier layer 18 is replaced with the superlattice in which the bottom of the first conduction band mini-zone is the position of the effective barrier height. The spacial frequency of the superlattice is increased ("chirped") such that the edge of the mini-zone rises in real space. Such a superlattice structure can be formed, for example, using a superlattice emulator.

Figure 6:
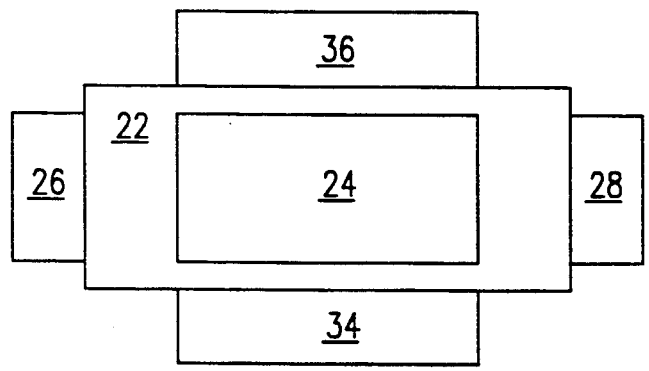
FIG. 6 is a top view of the programmable resistive element shown in FIG. 5.
Figure 7:
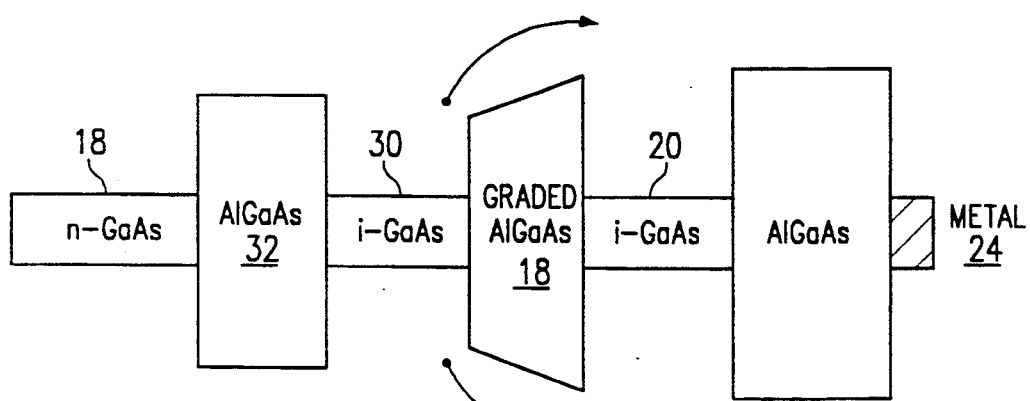
FIG. 7 is a band profile drawing of the programmable resistive element of FIG. 5.
Figure 5:
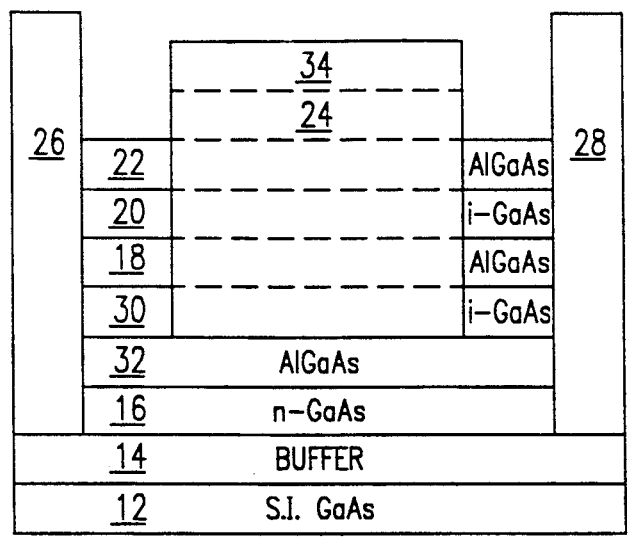
Figure 6:
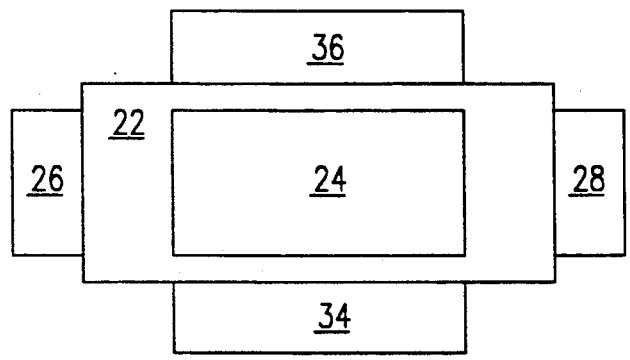
Figure 7:
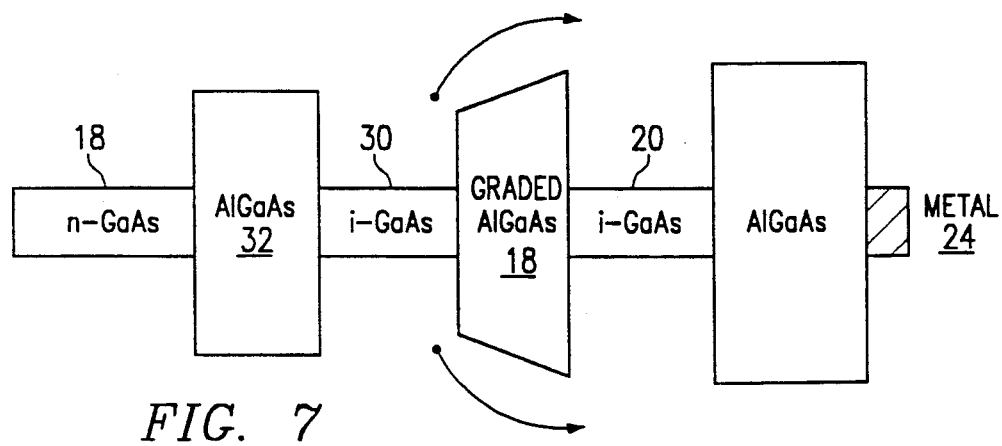

Referring next to FIG. 5, a second embodiment of transistor 10 is shown in which floating gate 20 may be charged with either electrons or holes. A top plan view of the transistor shown in FIG. 5 is given in FIG. 6. In this embodiment, a programming channel 30 has been added to transistor 10. Programming channel 30 is separated from channel 16 by a layer of AlGaAs 32 of a thickness of 700 to 1300 angstroms. An n-type contact 34 and a p-type contact 36 are made to opposite sides of the programming channel 30 as shown in FIG. 6. Contacts 34 and 36 may be formed for example by doped gallium arsenide. Barrier layer 16, now disposed between programming channel 30 and floating gate 20, is preferably graded to form a trapezoidal barrier using one of the approaches described above. The band profile for the structure shown in FIGS. 5 and 6 is given in FIG. 7.

The addition of programming channel 30 and contacts 34 and 36 allow floating gate 20 to be selectively charged with either electrons or holes. This process of selective injection is possible because the lateral p-i-n structure created by the n-type contact 34, the p-type contact 36 and the intrinsic layer comprising programming channel 30. The electrons or holes are injected from programming channel 30 to storage gate 20 when carrier flow is established between n-type contact 34 and p-type contact 36. Electrons may be drawn into channel 30 from n-type contact 34 while holes may be drawn into the channel from p-type contact. Channel 16 acts as a ground plane in close proximity to programming channel 30 allowing the control of the electrostatic potential of programming channel 30. Thus, the p-i voltage and the i-n voltage can be controlled separately. The magnitude of the charge injected onto storage gate 20 can be controlled by varying the terminal current applied to n-type contact 34 and p-type contact 36, thereby setting the impedance of channel 16.

Although a preferred embodiment of the present invention has been described in detail, it should be understood that various changes, substitutions and alterations can be made herein without departing from the spirit and scope of the invention as defined by the appended claims.

What is claimed is:

1. A method for forming a programmable resistive element, comprising the steps of:
    forming a channel region comprising a layer of gallium arsenide;
    forming a trapezoidal programming barrier disposed outwardly from said channel region;
    forming a storage gate disposed outwardly from said programming barrier comprising a layer of intrinsic gallium arsenide;
    forming an insulator disposed outwardly from said storage gate;
    forming a control gate disposed outwardly from said insulator; and
    forming first and second spaced apart contacts to contact said channel, wherein said step of forming a programming barrier comprised the step of forming a layer of composition modulated aluminum-gallium-arsenide.

2. A method for forming a programmable resistive element, comprising the steps of:
    forming a channel region comprising a layer of gallium arsenide;
    forming a trapezoidal programming barrier disposed outwardly from said channel region;
    forming a storage gate disposed outwardly from said programming barrier comprising a layer of intrinsic gallium arsenide;
    forming an insulator disposed outwardly from said storage gate;
    forming a control gate disposed outwardly from said insulator; and
    forming first and second spaced apart contacts to contact said channel, wherein said step of forming a trapezoidal barrier comprises the step of forming a chirped superlattice.

* * * * *